United States Patent

Kao et al.

[11] 4,212,566
[45] Jul. 15, 1980

[54] ROTARY FEEDER FOR SOLID PARTICLE INJECTION INTO PRESSURIZED FLUID SYSTEM

[75] Inventors: David T. Kao; Don J. Wood, both of Lexington, Ky.

[73] Assignee: University of Kentucky Research Foundation, Lexington, Ky.

[21] Appl. No.: 876,165

[22] Filed: Feb. 8, 1978

[51] Int. Cl.² .............................................. B65G 53/46
[52] U.S. Cl. ...................................................... 406/68
[58] Field of Search ....................... 302/11, 14, 15, 25, 302/49; 222/194; 406/63–68

[56] References Cited

U.S. PATENT DOCUMENTS

| | | | |
|---|---|---|---|
| 1,831,491 | 11/1931 | Hansen | 302/49 |
| 2,011,133 | 8/1935 | Yoss | 302/49 |
| 3,260,548 | 7/1966 | Reichl | 302/14 |
| 3,593,891 | 7/1971 | Kidd | 302/49 |
| 4,019,783 | 4/1977 | Kayser | 302/25 |

FOREIGN PATENT DOCUMENTS 2419841 10/1975 Fed. Rep. of Germany ............ 302/49

*Primary Examiner*—Jeffrey V. Nase
*Attorney, Agent, or Firm*—Birch, Stewart, Kolasch & Birch

[57] ABSTRACT

A rotary feeder for injecting solid particles into a pressurized fluid system is described. The system includes a hopper for receiving particles and a device for transporting the particles from the hopper to a feeder roller. The cylindrical feeder roller includes a plurality of recessed troughs that are positioned at an angle from the axis of the cylindrical roller. Particles are transported from the hopper to the recessed troughs of the feeder roller and are subsequently fed into a venturi section of a solid-liquid slurry pipe system. The rotary feeder for injecting solid particles into a pressurized fluid system is compact in size so as to be readily employed within a mine tunnel.

9 Claims, 3 Drawing Figures

ROTARY FEEDER FOR SOLID PARTICLE INJECTION INTO PRESSURIZED FLUID SYSTEM

BACKGROUND OF THE INVENTION

1. Field of the Invention

The present application relates to a rotary feeder for injecting solid particles into a pressurized fluid system. Solid particles are positioned within a hopper and are transported therefrom by means of a conveyor belt to a feeder roller. The feeder roller includes a plurality of troughs which are inclined with respect to the roller axis. Particles delivered to the roller troughs are injected into a venturi section of a solid-liquid slurry pipe system.

2. Description of the Prior Art

The patent issued to Burlingham et al, U.S. Pat. No. 1,020,743, discloses a rotary ash discharger that includes an ash hopper 1, a rotary cylinder 14, an ash pipe 9 and a discharge pipe 12. Particles received within the ash pockets are discharged therefrom by means of water which is injected into the pockets.

The Cassiere patent, U.S. Pat. No. 2,152,632, discloses a feeder mechanism for feeding or mixing cementitious material. The feed mechanism includes a hopper 2, a feed wheel 4, an air supply pipe 8 and an outlet pipe 9. Material positioned within the pockets 6 is rotated into communication with the conduit 7 and is subsequently discharged therefrom by means of the air pressure within the conduit 7 and air pipe 8 into the outlet pipe 9.

The patent issued to Thorsten, U.S. Pat. No. 2,648,572, discloses a fly ash feeder which includes a hopper 11, a conveyor screw S and a discharge outlet 73. Ash positioned within the hopper 11 is transported by means of the conveyor screw S to the upper end of the bell 70. The ash drops into the bell 70 and filters through the fluid within the receptacle 71 to the trough 72. Thereafter, the ash flows from the trough 72 into the discharge outlet 73 to the main manifold 15.

The present invention is directed to a compact rotary feeder for injecting solid particles into a pressurized system which may easily be employed in a mine tunnel. A feeder roller is disclosed which includes a plurality of recessed troughs that are positioned at an angle with respect to the axis of the feed roller. Particles positioned within the recessed troughs of the feed roller are injected into a venturi section of a solid-liquid slurry pipe section by means of a flushing conduit. In addition, the particles are injected by a secondary flushing produced by the venturi section. The prior art discussed above does not suggest the novel rotary feeder for injecting solid particles which is disclosed in the present invention.

SUMMARY OF THE INVENTION

It is an object of the present invention to provide a rotary feeder for injecting solid particles into a pressurized fluid system which is compact in size so as to be readily employed within a mine tunnel.

It is an object of the present invention to provide a feeder roller which includes a plurality of troughs therein that are positioned at an angle with respect to the axis of the feeder roller.

Another object of the present invention is to provide a feeder roller housing which includes two longitudinal slots therein one of which functions as an inlet port and the other of which functions as an outlet port.

A further object of the present invention is to provide a portable roller feeder for injecting solid particles into a pressurized system which may be easily transported to various locations.

A still further object of the present invention is to provide a rotary feeder which injects solid particles into a venturi section of a solid-liquid slurry pipe system.

Another object of the present invention is to provide a system which provides uniform feeding and a minimum disruption to the main stream flow.

A still further object of the present invention is to displace the venturi section to one side of the feeder roller housing so as to reduce leakage of fluid within the venturi section by means of the Couette flow principle. This design minimizes the wear on the housing and reduces the height requirement of the system.

These and other objects of the present invention are fulfilled by constructing a hopper which includes a conveyor belt positioned therein which transports material to a feeder roller. The feeder roller includes a plurality of troughs which are positioned at an angle to the axis of the feeder roller. Particles dropping into the trough section of the feeder roller are conveyed to a discharge opening in a venturi section of a solid-liquid slurry pipe system. Particles entering the venturi section are carried into the main pipe section where the pressure head at the entrance to the venturi section is converted into kinetic energy.

Further scope of applicability of the present invention will become apparent from the detailed description given hereinafter. It should be understood, however, that the detailed description and the specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENT

Figure 1:
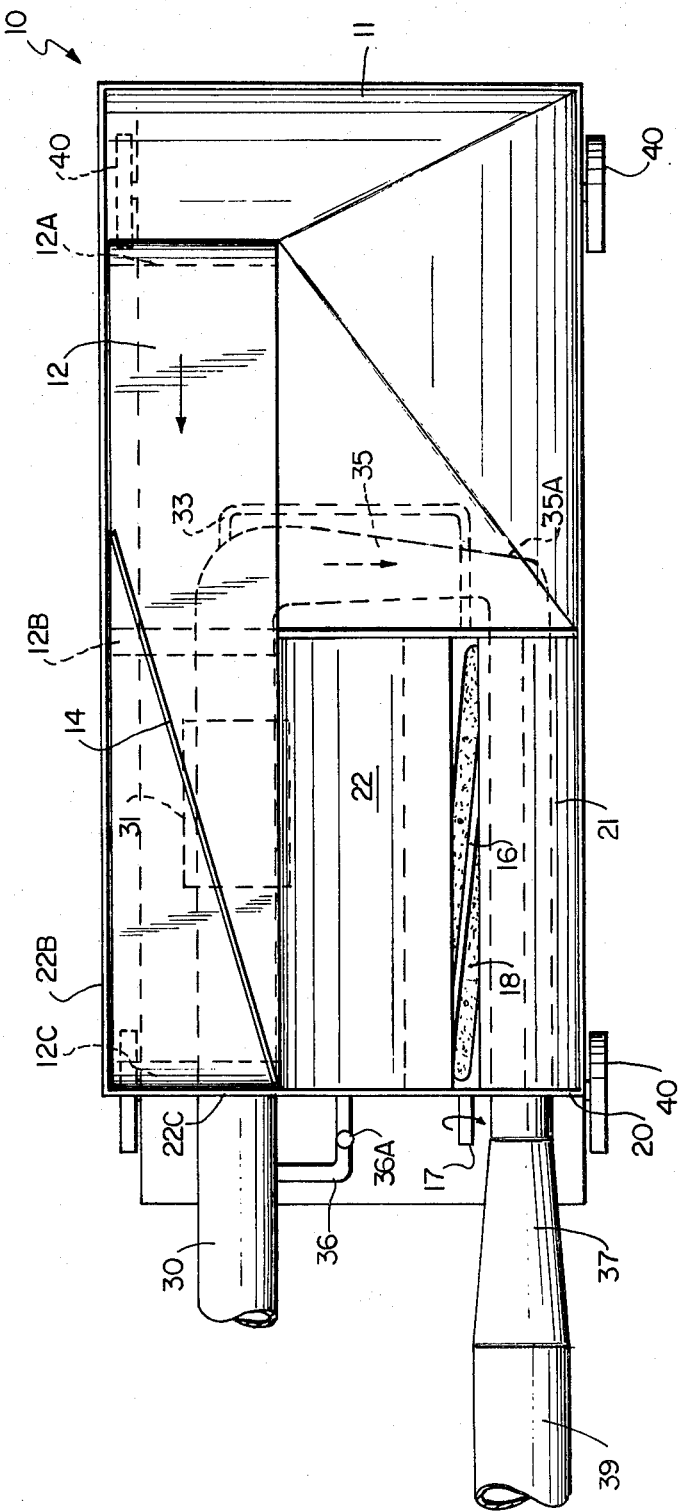
FIG. 1 is a plan view of the rotary feeder for injecting solid particles into a pressurized fluid system of the present invention.
Figure 2:
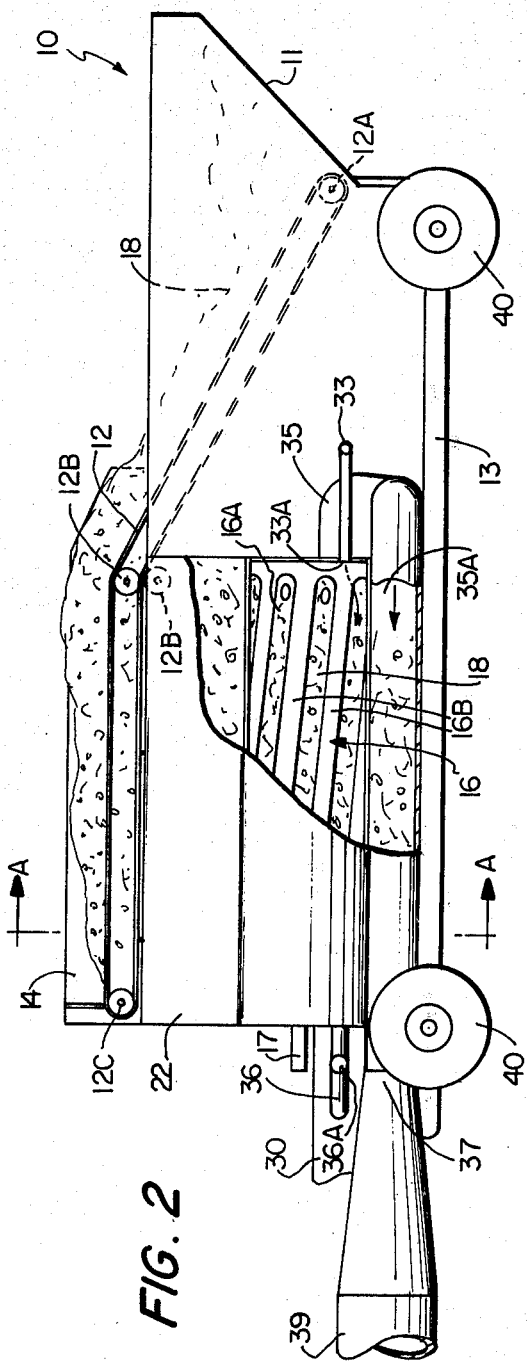
FIG. 2 is a cross-sectional view of the rotary feeder for injecting solid particles into a pressurized fluid system of the present invention.
Figure 3:
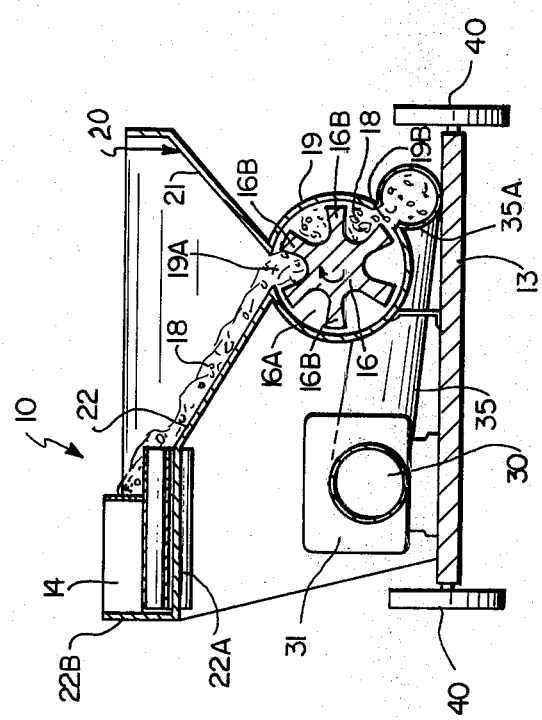
FIG. 3 is a cross-sectional view along line A—A of FIG. 2.

Referring in detail to FIGS. 1-3, there is illustrated a rotary feeder for injecting solid particles into a pressurized fluid system which is generally indicated by the numeral 10. Particles are deposited within the hopper 11 and are transported therefrom by means of the conveyor belt 12. The conveyor belt 12 is designed to include two sections. The first section, positioned within the hopper 11, is rotatably mounted on the rollers 12A and 12B and is upwardly inclined to transport particles from the hopper 11 to the second portion of the conveyor belt. The second portion of the conveyor belt is rotatably mounted on the rollers 12B and 12C and is generally disposed in a horizontal plane.

Particles positioned within the hopper 11 are transported upwardly to the horizontal section of the conveyor belt and are removed therefrom by means of the scraper 14. The scraper 14 is diagonally disposed across the horizontal section of the conveyor belt so as to remove the particles therefrom as the belt moves between the rollers 12B and 12C. Particles scraped from the horizontal section of the conveyor belt are deposited on the inclined upper portion 22 of the feeder roller housing. In addition, the feeder roller housing includes an inclined upper portion 21 which is removed from the inclined upper portion 22 and together they form a hopper which directs particles into the feeder roller.

Particles 18 being transported from the hopper 11 to the horizontal portion of the conveyor belt and scraped therefrom fall downwardly on the inclined upper portions 21 and 22 into the troughs of the feeder roller 16. The feeder roller housing 20 includes a rear wall 22C and a side wall 22B which prevent the escape of particles from the system. As shown in FIG. 1, the feeder roller 16 includes an axle 17 which projects outwardly from the rear wall 22C. In addition, the teeth 16B of the feed roller are disposed at an angle to the axis of the feeder roller.

The present invention includes a particle feeding system and a system for subsequently transporting the particles therefrom. The system for transporting the particles may be operated by water pressure or by air pressure. The transporting fluid is supplied to the particle injecting system by means of the conduit 30. Fluid contained within the conduit 30 is pressurized by means of the pump 31 and subsequently flows into a conduit 35 and thereafter into a venturi section 35A. The fluid within the venturi section 35A is injected with particles from the feeder roller through a slot 19B in the feeder roller housing.

To facilitate the injection of the particles 18 from the troughs of the feeder roller 16, the present invention includes a flushing conduit 33 for flushing the particles from the inclined troughs of the feeder roller 16. This feature will be more fully discussed hereinafter. Since the particles are injected and flushed into the venturi section 35A, which is of a smaller diameter than the discharge conduit 39, the pressure head at slot 19B is converted into kinetic energy by the drop in pressure created in this region by the venturi section. In other words, the acceleration of the particles 18 within the venturi section 35A tends to assist in the unloading of the solid particles from the troughs of the feeder roller 16 by eliminating back pressure from the liquid stream at the point of entry of solid particles into the liquid stream. This assistance provides a secondary flushing of the particles to supplement the flushing produced by the flushing conduit 33. In addition, the high velocity achieved by the venturi section increases the acceleration of particles through conduit 39.

The present invention produces excellent results by inclining the troughs relative to the axis of the feeder roller. If fluid should leak into the particle injecting system, it may be returned to the input conduit 30 via the displacement fluid return conduit 36 and the return valve 36A.

It should be understood, that the rotary feeder for injecting solid particles into a pressurized fluid system of the present invention is readily transportable within a mine tunnel. To facilitate the transportation of the system, it may be desirable to employ wheels 40 which will permit the system to be rolled into the mine tunnel. In addition, the input conduit 30 and the output conduit 39 are extendibly connected to conduits so that the system may be intermittently advanced as the mine tunnel is extended. As shown in FIGS. 2 and 3, the present invention includes a support frame 13. The elements of the present invention are mounted on the frame 13 and are designed to be compact in size so as to be conviently transported within the mine tunnel.

Particles 18 which are positioned in the upper portion of the feeder roller housing drop into the troughs 16A of the feeder roller 16. The particles positioned within the troughs 16A are transported from an inlet slot 19A in the feeder roller housing to an output slot 19B. Motion is imparted to the feeder roller 16 through the axle 17 which projects from the rear wall 22C of the feeder roller housing.

The troughs 16A are inclined with respect to the axis 17 of the feeder roller 16. This inclined positioning of the troughs 16A provides a more uniform feeding of the particles 18 from the upper portion of the feeder roller housing to the output slot. In addition, the inclined positioning of the troughs 16A minimizes the shearing force of the particles 18 which protrude from the troughs 16A.

Particles 18 positioned within the troughs 16A are injected into the venturi section 35A and are accelerated into the output conduit 39. The particles positioned within the troughs 16A are flushed therefrom by means of the flushing conduit 33. In addition, particles 18 positioned within the troughs 16A are flushed therefrom by means of the secondary flushing jet flow of the fluid through the venturi section 35A.

As previously discussed, fluid is supplied to the particle injecting system by means of the conduit 30. The fluid contained within the conduit 30 is pressurized by means of the pump 31 and subsequently flows into a conduit 35 and thereafter into a venturi section 35A. The fluid within the venturi section 35A is injected with particles from the troughs 16A of the feeder roller 16 through an output slot 19B in the feeder roller housing. As discussed above, the particles 18 within the troughs 16A are flushed therefrom by means of the flushing conduit 33 and also by means of a secondary flushing jet flow of the fluid within the venturi section 35A. It should be understood, that particles 18 injected into the venturi section 35A are carried into the output conduit 39 where the pressure head at the output slot 19B is decreased by the venturi section and is converted into kinetic energy.

The rotary feeder for injecting solid particles into a pressurized fluid system is designed to minimize interruptions in the flow of fluid through the main conduits and to uniformly feed particles thereto. The venturi section 35A is displaced to one side of the feeder roller housing 19 so as to reduce leakage of the fluid within the venturi section by means of the Couette flow principle. Further, this design minimizes the wear on the feeder roller housing and reduces the height requirements of the system.

The particle injecting system of the present invention includes a displaced fluid return conduit 36 which directs displaced fluid due to a possible leakage in the system to the input conduit 30. The displaced fluid conduit 36 includes a valve 36A to control the flow therethrough. The conduit 36 is designed to alleviate any problems resulting from possible leakage in the system. The clearance between the feeder roller 16 and the feeder roller housing 19 is designed to prevent excessive leakage of the pressurized fluid within the venturi section 35A into the upper portion of the feeder roller housing. If fluid should leak into the upper portion of the feeder roller housing, it is readily removed therefrom by means of the displaced fluid return conduit 36.

Referring to FIG. 3, positioned within the substantially cylindrical feeder roller housing 19 is a feeder roller 16 which includes a plurality of troughs 16A and a plurality of teeth 16B. As previously discussed, the troughs 16A are positioned at a slight incline with respect to the axis of the feeder roller 16. The particle injecting system is designed to include a close clearance between the teeth 16B and the substantially cylindrical feeder roller housing 19. The close clearance between these two elements reduces the leakage between the pressurized fluid within the venturi section 35A and the upper portion of the feeder roller housing.

DESCRIPTION OF OPERATION

In operation, particles in the hopper 11 are conveyed upwardly by means of the conveyor belt 12 and are removed from the horizontal portion of the conveyor belt by the scraper 14. Particles removed from the conveyor belt are deposited on the inclined upper portion 22 of the feeder roller housing 20. The particles 18 fall downwardly through the slot 19A and into the troughs 16A of the feeder roller 16. The troughs 16A are inclined with respect to the axis of the feeder roller 16. This inclined positioning of the troughs 16A provides a more uniform feeding of the particles 18 from the upper portion of the feeder roller housing to the output slot 19B.

Particles 18 positioned within the troughs 16A are injected into the venturi section 35A and are accelerated into the output conduit 39. The particles positioned within the troughs 16A are flushed therefrom by means of the flushing conduit 33. In addition, particles 18 positioned within the troughs 16A are flushed therefrom by means of the secondary flushing jet flow of the fluid through the venturi section 35A.

Fluid enters the system through the conduit 30 and is pressurized by means of the pump 31 and subsequently flows into a conduit 35 and thereafter into a venturi section 35A. The fluid within the venturi section 35A is injected with particles from the troughs 16A of the feeder roller 16 through an output slot 19B in the feeder roller housing. As discussed above, the particles 18 within the troughs 16A are flushed therefrom by means of the flushing conduit 33 and also by means of a secondary flushing jet flow of the fluid within the venturi section 35A. The flushing conduit 33 is connected to the outside corner of the reducing elbow which is downstream from the pump 31. The pressure of the fluid at the reducing elbow is higher than the normal stream pressure. Utilizing this higher pressure as a flushing jet stream through the conduit 33 facilitates the unloading of the solid particles 18 from the troughs 16A into the venturi section 35A.

The present invention is designed to minimize interruptions in the flow of fluid through the main conduits and to uniformly feed particles thereto. The venturi section 35A is displaced to one side of the cylindrical feeder roller housing 19 so as to reduce leakage of the fluid within the venturi section by means of the Couette flow principle. In addition, particles 18 injected into the venturi section 35A are carried into the output conduit 39 where the pressure head at the output slot 19B is decreased by the venturi section and is converted into kinetic energy.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:
1. An apparatus for injecting particles into a pressurized fluid system comprising:
   a conduit including a flow of pressurized fluid therein for transporting particles and a venturi section which extends along a portion of the conduit from an upstream end to a downstream end;
   said venturi section of said conduit including an opening through which particles are injected into said pressurized fluid;
   a feeder roller including a plurality of inclined troughs positioned at an angle with respect to an axis of said feeder roller;
   said inclined troughs extending along said feeder roller from a lower upstream end to a higher downstream end with respect to said flow of pressurized fluid within said conduit;
   a flushing conduit with one end thereof in communication with said flow of pressurized fluid at a point upstream of said venturi section, said flushing conduit including a discharge end being intermittently connected to said inclined troughs at the lower upstream end thereof; and
   said flow of pressurized fluid within said conduit and the flow of pressurized fluid within said flushing conduit being in the same direction and effecting an injecting of particles positioned within said inclined troughs through said opening and into said venturi section of said conduit.

2. An apparatus for injecting particles into a pressurized fluid system according to claim 1, and further including a hopper adapted to receive particles and means for transporting the particles from the hopper to said feeder roller.

3. An apparatus for injecting particles into a pressurized fluid system according to claim 2, wherein the means for transporting particles from the hopper to the feeder roller comprises a conveyor belt which includes an upwardly inclined portion and a substantially horizontal portion.

4. An apparatus for injecting particles into a pressurized fluid system according to claim 3, wherein the substantially horizontal portion of the conveyor belt includes a scraper to remove particles therefrom and deposit them into an upper portion of a feeder roller housing.

5. An apparatus for injecting particles into a pressurized fluid system according to claim 4, wherein the feeder roller housing includes an upper portion for receiving particles and a substantially cylindrical portion adapted to receive the feeder roller.

6. An apparatus for injecting particles into a pressurized fluid system according to claim 5, wherein the substantially cylindrical portion of the feeder roller housing includes an input slot through which particles drop into the troughs of the feeder roller and an output slot from which particles are injected into said venturi section of said conduit.

7. An apparatus for injecting particles into a pressurized fluid system according to claim 5, wherein said venturi section of said conduit is positioned along and displaced upwardly from a bottom portion of said substantially cylindrical portion of said feeder roller housing.

8. An apparatus for injecting particles into a pressurized fluid system according to claim 1, and further including a pump for pressurizing said fluid within said conduit.

9. An apparatus for injecting particles into a pressurized fluid system according to claim 1, wherein said fluid is a liquid and said particles are discharged from said apparatus as a solid-liquid slurry.

* * * * *